United States Patent [19]
Jean-Marc

[11] Patent Number: 6,111,376
[45] Date of Patent: Aug. 29, 2000

[54] MOTORIZING AWNING WITH AUTOMATIC SAFETY CONTROL

[75] Inventor: Vignoli Jean-Marc, Thorens-Glieres, France

[73] Assignee: Somfy, Cluses, France

[21] Appl. No.: 09/328,832

[22] Filed: Jun. 8, 1999

[30] Foreign Application Priority Data

Jul. 1, 1998 [FR] France .................................. 98 08381

[51] Int. Cl.[7] ...................................................... H02P 7/00
[52] U.S. Cl. ......................... 318/432; 318/488; 318/468; 318/469; 160/5
[58] Field of Search ..................... 318/488, 265, 318/266, 466, 467, 468, 469, 432; 160/3, 5, 7, 59, 64, 66

[56] References Cited

U.S. PATENT DOCUMENTS

| | | | |
|---|---|---|---|
| 3,586,259 | 6/1971 | Richt | 242/334.2 |
| 4,079,597 | 3/1978 | Lindner et al. | 64/5 |
| 4,118,659 | 10/1978 | Klemm | 318/560 |
| 4,347,993 | 9/1982 | Leonard | 242/413 |
| 4,625,565 | 12/1986 | Eiichi et al. | |
| 4,789,813 | 12/1988 | Orchard | 318/6 |
| 5,225,748 | 7/1993 | Haring. | |
| 5,623,189 | 4/1997 | Hemmer | 318/432 |
| 5,760,558 | 6/1998 | Popat | 318/480 |
| 5,850,131 | 12/1998 | Wolfer et al. | 318/430 |

FOREIGN PATENT DOCUMENTS

| | | |
|---|---|---|
| 0822316A2 | 2/1998 | European Pat. Off. . |
| 4009373 | 7/1993 | Germany . |
| 44 07 342 | 11/1994 | Germany . |

OTHER PUBLICATIONS

French Preliminary examination report in SN 9808381—France.

*Primary Examiner*—Stanley J. Witkowski
*Assistant Examiner*—Rita Leykin
*Attorney, Agent, or Firm*—Bugnion S. A.; John Moetteli

[57] ABSTRACT

An awning, in particular an awning with a supporting arm, the cloth (1) of which can be unwound from a tube or winding shaft (2) driven by an electric motor (9) and in which are provided means for measuring the drive torque which supply a variable representing the windforce acting on the awning cloth. The measuring means are associated with a logical processing unit (15) in which are recorded three torque values, namely a danger, a safety and an all-clear value, on the basis of which values the LPU allows or activates the partial or complete unwinding or winding of the cloth.

1 Claim, 1 Drawing Sheet

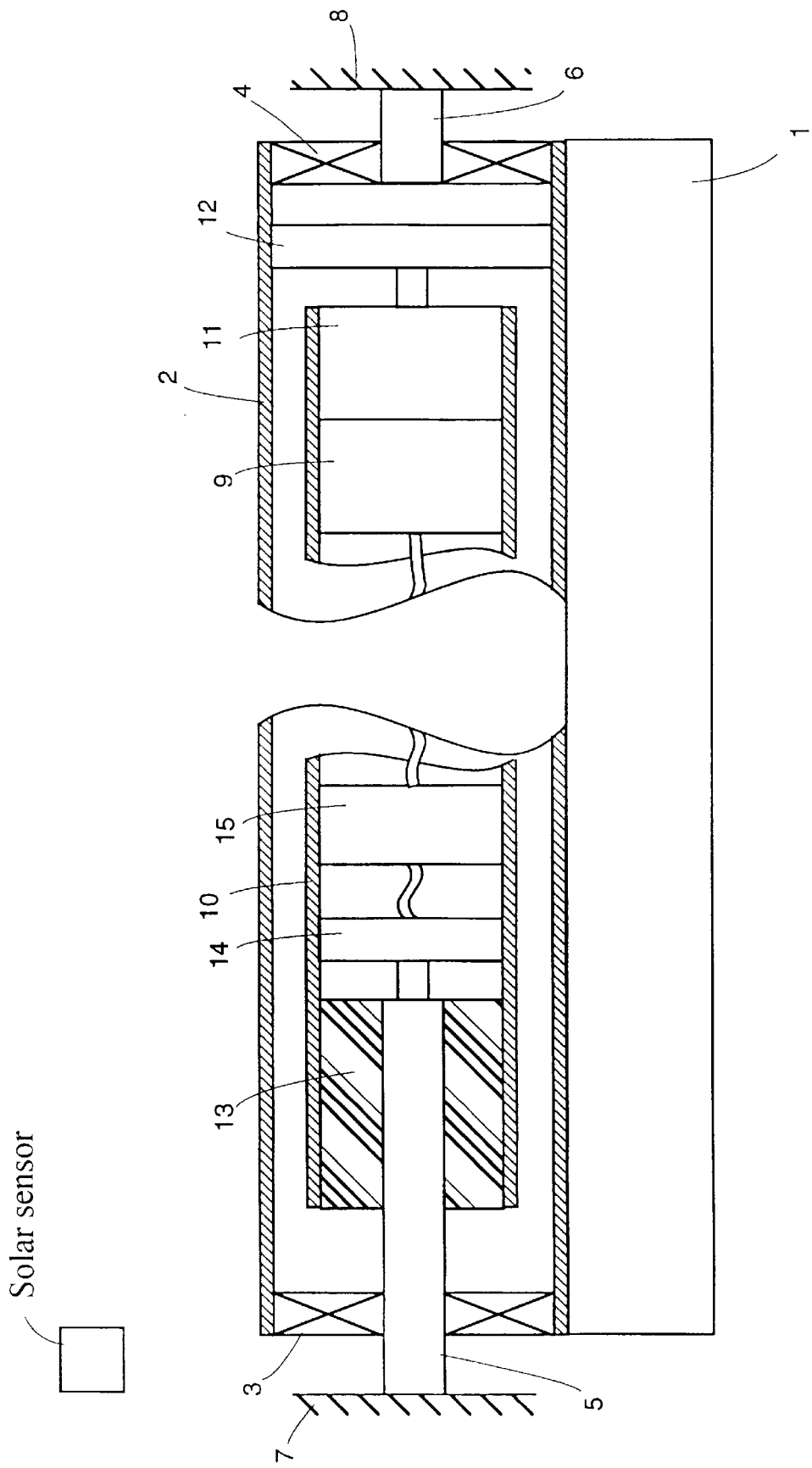

MOTORIZING AWNING WITH AUTOMATIC SAFETY CONTROL

BACKGROUND OF THE INVENTION

The present invention relates to an awning, in particular an awning with a supporting arm, the cloth of which can be unwound from a tube or winding shaft driven by an electric motor and in which is provided a means for measuring the drive torque which supplies a variable representing the windforce acting on the awning cloth.

Such an awning is known from German Patent Application DE 44 07 342, the content of which is incorporated by reference. The tubular motor housing, mounted inside a winding tube, is fastened to a rigid bar by means of a plastic sleeve which allows some rotation of the motor housing around its support when a sufficient torque is applied to this housing. The housing is provided internally with two stops between which a bare is engaged which works by flexural stress and to which is fastened a strain gage supplying a voltage representing the torque. When high stresses are exerted on the deployed awning cloth by the wind, the motor housing is driven in rotation. Its stops exert flexural force on the bar carrying the strain gage connected to the device controlling the awning motor. As soon as the flexion of the detection bar reaches a particular threshold in one direction or the other, the winding of the awning is activated. The awning is stopped in intermediate positions by means of position sensors located outside.

It is known, moreover, from Patent Application EP 0,822, 316, the content of which is incorporated by reference, to detect a predetermined angular displacement of a motor housing (restrained in terms of rotation by a spring) by means of optical sensors, in order to cut off the supply to the motor when the product driven by the motor reaches a limit stop at the end of its travel. This device therefore provides only discrete values which are determined by the position of the optical sensors. A new setting requires action on the motor in order to displace the optical sensors.

It is known, moreover, for example from Patent DE 40 09 373, the content of which is incorporated by reference, to measure the windforce by means of an anemometer. Not only does this solution make it necessary to mount an anemometer at a suitable point on the building, corresponding cabling or a wireless link by transmitter and receiver, but also the information obtained will usually not correspond to the stresses actually experienced by the awning cloth, the wind conditions being different in the region of the awning than in the region of the anemometer. Furthermore, an anemometer screw may seize up or be completely jammed due to ice.

It is desirable to permit intermediate positions of deployment of the awning cloth, so as not to eliminate completely the solar protection effect of the awning in the event of a wind of medium force which does not allow the cloth to be kept fully deployed, but allows a partially deployed cloth to withstand the stresses exerted by the wind.

SUMMARY OF THE INVENTION

The object of the present invention is to produce a motorized awning meeting the abovementioned requirements.

For this purpose, the awning according to the invention is defined in that the torque measuring means is associated with a logical processing unit (LPU) in which three torque values are recorded, namely a first so-called danger value, a second so-called safety value and a third so-called all-clear value, this LPU being programmed in such a way that, with the awning stopped and at least partially unwound, if the torque exceeds the danger value, the LPU activates the unwinding of the cloth until the torque falls below the safety value, and in such a way that, if the torque falls below the all-clear value, the LPU activates the unwinding of the cloth as long as the torque does not pass the safety value again, and, with the awning wound up, the LPU allows the cloth to be unwound for as long as the torque does not pass the safety value.

Thus, if the wind is not very strong, but the cloth is fully deployed, and the danger threshold is exceeded, the cloth will be partially rewound, until the safety threshold is passed, and will still be capable of at least partially performing its solar protection function. As soon as the wind drops sufficiently or ceases, the all-clear threshold is passed in the downward direction and the cloth can be redeployed to a greater extent until the safety threshold is, or is not reached. In the absence of wind, deployment is complete, without this safety threshold being reached.

The stopping of the deployment of the awning is not determined by intermediate sensors, but solely by the torque values recorded in the LPU. These torque values can be modified easily and can be adapted to each dimension and type of cloth.

The more the awning cloth is shaken by the wind, the higher the measured torque will be.

The measurement of the torque therefore gives a very good indication of the stresses experienced by the awning cloth.

Moreover, the algorithm used is distinguished by its great simplicity.

BRIEF DESCRIPTION OF THE DRAWING

The accompanying drawing illustrates one embodiment of the invention by way of example.

FIG. 1 is a partially diagrammatic view in axial section of an awning winding tube.

DETAILED DESCRIPTION OF THE PREFERRED EMBODIMENT(s)

In FIG. 1 a cloth 1 can be wound and unwound on a winding tube 2 provided, at its ends, with two flanges 3 and 4 mounted rotatably on two bearings 5 and 6 fastened to supports 7 and 8. Mounted inside the winding tube in a known fashion is an electric motor 9 mounted in a tubular housing 10 and associated with a reducer 11, the output shaft of which drives a gearwheel 12 driving the winding tube 2 in rotation by means of an internal ring gear which this winding tube comprises. At the end opposite to the gear wheel 12, the tubular housing 10 of the motor is supported by the bearing 5 by means of an elastic connection 13, for example made of synthetic material. A magnetic HALL probe position sensor 14, as described in Patent EP 0665416, the content of which is incorporated by reference, is fastened in the extension of the bearing 5.

The stator of this sensor is fastened to the bearing 5, whilst its tubular yoke is integral in terms of rotation with the housing 10.

The HALL probe of the sensor 14, mounted so as to be able to measure angular displacement of the sensor, is connected to a control circuit 15. The control circuit 15 is connected electrically to the motor 9. The amount of angular displacement is correlated to the torque and thus torque can be easily measured. The control device 15 comprises an LPU (logical processing unit), in which are recorded three values of the angular displacement of the sensor 14, namely a so-called danger value, a safety value and a so-called all-clear value, the all-clear value of course being lower than the safety value, itself lower than the danger value. Furthermore, the LPU is programmed in such a way that, if the angular displacement exceeds the danger value, the LPU activates the winding of the cloth, until the angular displacement falls below the safety value, and in such a way that, if the angular displacement falls below the all-clear value, the LPU allows the cloth to be unwound as long as the angular displacement does not pass the safety value.

It would, of course, be possible to use an angular displacement sensor of a different type or any other means of measuring the torque.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. An awning, in particular an awning with a supporting arm and a cloth attached thereto, the cloth (1) of which can be unwound from a tube or a winding shaft (2) driven by an electric motor (9) and in which are provided means for measuring a drive torque which supply a variable representing the windforce acting on the cloth, wherein the torque measuring means are associated with a logical processing unit ("LPU")(15), in which are recorded three torque values, namely a danger value, a safety value and an all-clear value, the LPU being programmed in such a way that, with the awning stopped and at least partially unwound, if the torque exceeds the danger value, the LPU activates the winding of the cloth, until the torque falls below the safety value and in such a way that, if the torque falls below the all-clear value, the LPU activates the unwinding of the cloth as long as the torque does not pass the safety value again, and, with the awning wound up, the LPU allows the cloth to be unwound for as long as the torque does not pass the safety value.

* * * * *